United States Patent
Hirahara et al.

Patent Number: 6,145,239
Date of Patent: Nov. 14, 2000

[54] LURE

[75] Inventors: Kenji Hirahara, Osaka; Toshihiko Yasui, Tondabayashi, both of Japan

[73] Assignee: Shimano Inc., Sakai, Japan

[21] Appl. No.: 09/443,096

[22] Filed: Nov. 18, 1999

[30] Foreign Application Priority Data

Nov. 24, 1998 [JP] Japan .................................. 10-332177
Aug. 4, 1999 [JP] Japan .................................. 11-220821

[51] Int. Cl.$^7$ ..................................................... A01K 85/01
[52] U.S. Cl. ..................................................... 43/42.34
[58] Field of Search ............................... 43/42.24, 42.32, 43/42.33, 42.34

[56] References Cited

U.S. PATENT DOCUMENTS

| | | | |
|---|---|---|---|
| 2,117,206 | 5/1938 | Neff | 43/17.6 |
| 2,752,721 | 7/1956 | Denny | 43/42.33 |
| 2,938,293 | 5/1960 | Richardson | 43/42.24 |
| 3,359,114 | 12/1967 | Witteman et al. | 43/4 |
| 3,367,060 | 2/1968 | Abercrombie | 43/42.33 |
| 3,802,115 | 4/1974 | Auten et al. | 43/42.24 |
| 3,879,883 | 4/1975 | Strader | 43/42.32 |
| 4,203,246 | 5/1980 | Sacharnoski, Sr. | 43/42.31 |
| 4,468,881 | 9/1984 | Gordon, III | 43/42.25 |
| 4,581,839 | 4/1986 | Mattison | 43/17.6 |
| 4,800,670 | 1/1989 | Mattison | 43/17.6 |
| 4,862,631 | 9/1989 | Wilson et al. | 43/42.33 |
| 5,018,297 | 5/1991 | Kennedy, Jr. | 43/42.28 |
| 5,070,639 | 12/1991 | Pippert | 43/42.31 |
| 5,245,783 | 9/1993 | Cumiskey | 43/42.37 |
| 5,333,405 | 8/1994 | Bowles | 43/42.06 |
| 5,377,443 | 1/1995 | Giray et al. | 43/44.9 |

*Primary Examiner*—Michael J. Carone
*Assistant Examiner*—Son T. Nguyen
*Attorney, Agent, or Firm*—Shinjyu an Intellectual Property Firm

[57] ABSTRACT

A soft bait lure includes a lure main body (1) formed with an elastic synthetic resin material to have an outer shape resembling a small fish and particles of glass material (2) that are mixed in a lower half portion of the lure main body (1). The lure main body (1) is formed of an elastic material such as vinyl polychloride, polychloroprene rubber, polyisoprene rubber, or natural rubber, etc. The glass material (2) is mixed in a lower half portion of the lure main body (1).

8 Claims, 6 Drawing Sheets

LURE

BACKGROUND OF THE INVENTION

A. Field of the Invention

The present invention relates to a lure, and more particularly, to a soft bait lure formed of an elastic synthetic resin material and whose outer shape resembles a small fish or the like.

B. Description of the Background Art

A conventional soft bait lure includes a lure main body which is formed of a rubber-like synthetic resin to have an outer shape resembling, for example, a small fish or a small animal such as an angleworm and a crayfish. For fishing, the soft bait lure is attached to a hook which is linked to the front end of line, and further, a sinker or the like is further attached to the line. The soft bait lure allures a fish as the elastic lure main body moves as if swimming as living bait in water.

In addition, some conventional soft bait lures are heavy so as to sink swiftly in water. A soft bait lure of this type contains salt within a synthetic resin which forms a lure main body so that the specific gravity of the lure main body is large.

However, a soft bait lure containing salt as described above used lure over a long period of time in water begins to degrade such that salt contained in the lure main body dissolves in water and the lure main body crumbles. Further, while a soft bait lure is typically used with a hook inserted into the lure main body, the hook inserted in the lure main body may rust away due to salt contained in the lure main body.

SUMMARY OF THE INVENTION

An object of the present invention is to provide a soft bait lure that has an extended usable life and sinks quickly in water.

In accordance with one aspect of the present invention, a soft bait lure used for fishing, includes a lure main body formed of an elastic synthetic resin and particles of a glass material located in portions of the lure main body.

According to the above aspect of the present invention, the glass material mixed in the lure main body increases the specific gravity of the lure as a whole. As a result, casting with the soft bait lure holding a hook which is linked to the front end of line sinks the lure speedily in water. In addition, even long-time use does not cause the glass material to dissolve from the lure main body, and hence, the lure will not crumble nor will a hook inserted in the lure rust away. As the glass material reflects light diffusely, it is possible to attract a fish's interest in water.

Preferably, the particles of glass material have a particle diameter of 50 to 1500 µm.

Since the elasticity of the synthetic resin which forms the lure main body decreases correspondingly as the particle diameter of the glass material exceeds a predetermined upper limit, when the lure restores its original shape after deformed, restoration becomes poor. Conversely, if the particle diameter value of the glass material becomes smaller than a predetermined lower limit, the glass material increasingly whitens the lure main body. Moreover, this increases the viscosity of the synthetic resin which forms the lure main body, which in turn makes molding of the synthetic resin less easy.

Preferably, the particles of glass material have a particle diameter of 50 to 400 µm.

While the particle diameter value of the glass material remains within a predetermined range, changing an amount of the glass material to be mixed in the lure main body makes it possible to manufacture lures having various specific gravity values in an easy manner.

Preferably, the glass material is located in a lower portion of the lure main body.

In this structure, the glass material which is contained in a lower portion of the lure main body partially changes the specific gravity of the lure itself. This allows the lure to sink quickly in water and easily change its swimming posture. Further, as the lure partially reflecting light in a diffused manner, the lure attracts a fish's interest.

Preferably, the lure main body and the particles of glass together have a specific gravity in a range of between 1.2 and 1.6 g/cm$^3$.

When the lure has such a specific gravity, the lure sinks in water at an appropriate speed.

In accordance with another aspect of the present invention, a soft bait lure used for fishing includes a torso portion formed with an elastic synthetic resin and a caudal fin portion formed with an elastic synthetic resin integrally connected to the torso portion. A bottom surface of the caudal fin portion extends above a plane defined by a bottom surface of the torso portion. The particles of glass material are mixed only in the torso portion in the vicinity of the bottom surface of the torso portion.

In this structure, the glass material which is mixed in the torso portion increases the specific gravity of the lure as a whole. As a result, casting with the soft bait lure holding a hook which is linked to the front end of line sinks the lure speedily in water. In addition, even long-time use does not cause the glass material to dissolve from the lure main body, and hence, the lure will not crumble nor will a hook inserted in the lure rust away.

Further, as the glass material is located in the vicinity of the bottom surface of the torso portion, the center of gravity of the lure as a while is in the vicinity of the bottom surface of the torso portion. This permits the lure to swim with a stable posture in water. Moreover, during production, the glass material does not easily get mixed in the caudal fin portion whose bottom surface is positioned above a prolongation from the bottom surface of the torso portion. Containing no glass material, the caudal fin portion reacts sensitively to running water, and hence, the lure while swimming makes sharp actions.

In accordance with another aspect of the present invention, a soft bait lure used for fishing includes a lure main body formed of an elastic synthetic resin and particles of metallic material mixed in the lure main body.

In this structure, the metallic material which is mixed entirely in the lure main body increases the specific gravity of the lure as a whole. As a result, casting with the soft bait lure holding a hook which is linked to the front end of line sinks the lure speedily in water. In addition, even long-time use does not cause the metallic material to dissolve from the lure main body, and hence, the lure will not crumble nor a hook inserted in the lure will rust away.

As described above, a soft bait lures according to the present invention does not lose its shape even when used over a long period of time and sinks quickly in water.

These and other objects, features, aspects and advantages of the present invention will become more fully apparent from the following detailed description of the present invention when taken in conjunction with the accompanying

DESCRIPTION OF THE PREFERRED EMBODIMENTS

First Embodiment

In the following, a first embodiment of the present invention is described with reference to FIGS. 1 and 2.

Figure 1:
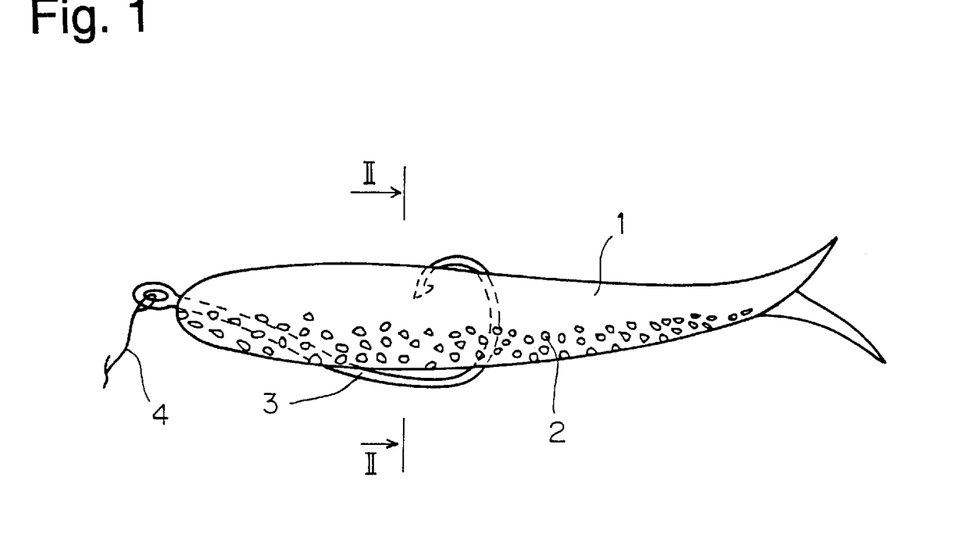
FIG. 1 is a side view of a lure according to a first embodiment of the present invention.
Figure 2:
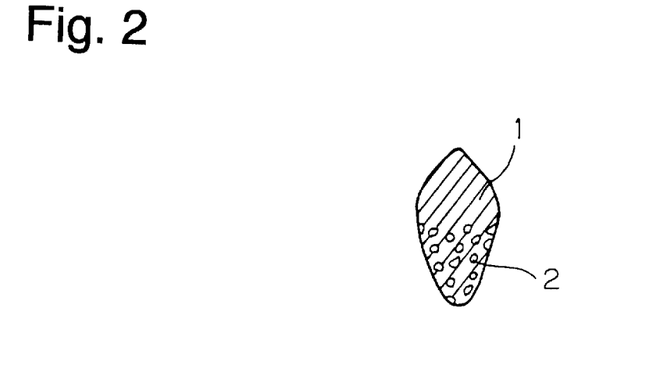
FIG. 2 is a cross sectional view of the lure depicted in FIG. 1 taken along a line II—II in FIG. 1.

As shown in FIGS. 1 and 2, a soft bait lure according to the first embodiment of the present invention includes a lure main body 1 formed with an elastic synthetic resin and a glass material 2 that is mixed in a lower half portion of the lure main body 1 along a longitudinal direction of the lure main body 1. The lure main body 1 is formed to have an outer shape resembling a small fish.

The lure main body 1 may be made of a variety of elastic, synthetic resin materials, such as vinyl polychloride, polychloroprene rubber, polyisoprene rubber, or natural rubber, etc. The materials that make up the lure main body 1 are chosen such that the lure main body is transparent or at least semi-transparent. In order to attract fish in water, a fluorescent color may be added to the synthetic resin which forms the lure main body 1 or the lure main body 1 may be painted on its surface in a variety of patterns or colors.

The glass material 2 is preferably in the form of a powder-like or small sphere-like material that may be formed by, for instance, crushing glass. A particle diameter of the glass material 2 is preferably in the range of 50 to 1500 $\mu$m, more preferably 50 to 400 $\mu$m, and further preferably, 50 to 150 $\mu$m. As the particle diameter of the glass material 2 increases, the elasticity of the lure main body 1 decreases relatively so that when the lure is restored to its original shape after deformed, the appearance of the restoration to original shape is poor. Conversely, if the particle diameter of the glass material 2 is decreased too much, the glass material dramatically whitens the lure main body 1 thereby affecting the transparent qualities of the lure main body 1. Moreover, this increases the viscosity of the synthetic resin which forms the lure main body 1, which in turn makes molding of the synthetic resin more difficult and production more complex.

Preferably, the glass material 2 is Unipowder (trade name, available from Union Co., Ltd.) or the like. While the glass material 2 may be transparent, a glass material of glass which is colored in any of a variety of colors may be used instead. Further, in order to enhance the tightness of contact between the glass material 2 and the synthetic resin which forms the lure main body 1, surfaces of the glass material 2 may be treated with amino-silane coupling reaction. It is desirable to adjust the quantity of the glass material 2 to be suspended in the lure main body 1 such that the specific gravity of the lure upon completion is approximately 1.2 to 1.6.

The lure structured as described above, as shown in FIG. 1, is preferably used with a hook 3 that is attached to the front end of line 4. The hook 3 is inserted from the hook end side into the lure main body at the lure head side and is accordingly held in place as shown in FIG. 1. When the lure is cast into water, since the glass material 2 mixed in the lure main body 1 increases the specific gravity of the lure as a whole, the lure sinks quickly. Since the glass material 2 is primarily located in the lower half of the lure main body 1, the lure main body 1 generally remains in the orientation depicted in FIG. 1 when submerged in water. Further, since the glass material 2 does not dissolve in water even as the lure is used over a long period of time, the lure does not crumble or disintegrate. Further, the hook 3 inserted in the lure does not rust.

In addition, since the glass material 2 is mixed only in the lower half portion of the lure main body 1 along the longitudinal direction of the lure main body 1, the lure keeps a good balance in water and hence swims smoothly. Moreover, when receiving light in water, the glass material 2 contained in the lure main body 1 reflects light diffusely and attracts a fish's interest.

Second Embodiment

A second embodiment of the present invention is described below with reference to FIG. 3.

Figure 3:
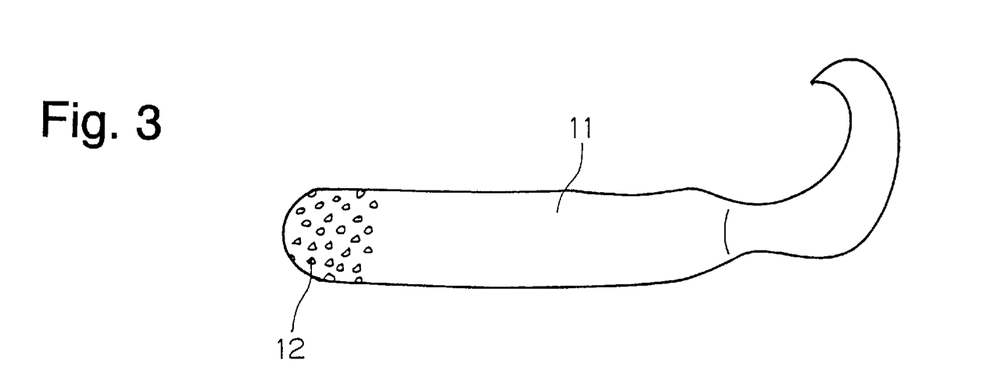
FIG. 3 is a side view of a lure according to a second embodiment of the present invention.

As shown in FIG. 3, a soft bait lure according to the second embodiment of the present invention includes a lure main body 11 which is formed with an elastic synthetic resin and a glass material 12 that is mixed in the lure main body 11 in the vicinity of a head portion of the lure main body 11. The lure main body 11 is formed in a shape resembling a small animal.

As in the first embodiment, the lure main body 11 is made of an elastic synthetic resin material such as vinyl polychloride, polychloroprene rubber, polyisoprene rubber, or natural rubber etc. A particle diameter of the glass material 12 is 50 to 150 $\mu$m, and the glass material 12 is mixed in the lure main body 11 in the vicinity of the head portion of the lure main body 11. The glass material 12 is generally the same material as the glass material 2 described above in the first embodiment.

As described above in the first embodiment, the lure of the second embodiment structured as described above quickly sinks in water, and even long-time use of the lure does not cause the glass material 12 to dissolve from the lure main body 11. Further, since the glass material 12 is locally disposed in the vicinity of the head portion of the lure main body 11, the center of gravity of the lure is in the vicinity of the head portion of the lure main body 11. This permits the lure to swim with a stable posture in water, with the head portion directed toward the bottom of water.

Third Embodiment

A third embodiment of the present invention will be described below with reference to FIG. 4.

Figure 4:
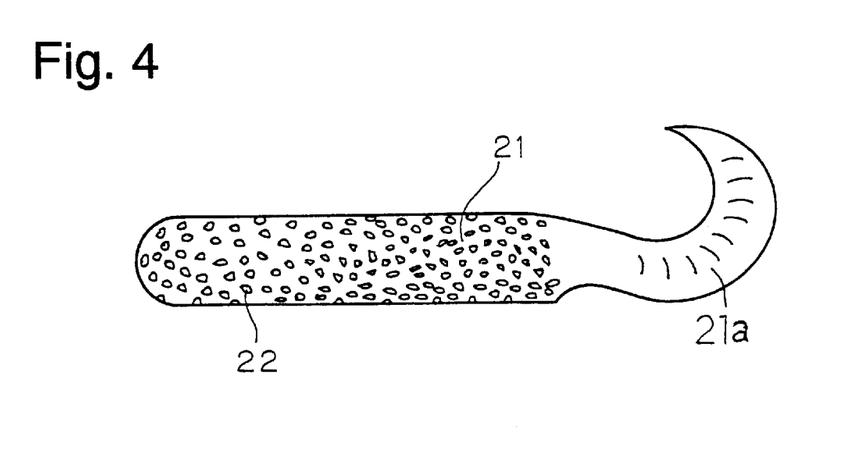
FIG. 4 is a side view of a lure according to a third embodiment of the present invention.

As shown in FIG. 4, a soft bait lure according to the third embodiment of the present invention includes a lure main body 21 which is formed of an elastic synthetic resin to have an outer shape resembling a small animal and a glass material 22 which is mixed in the lure main body 21 entirely except in a caudal fin portion 21a. The lure main body 21 is preferably made of vinyl polychloride, polychloroprene rubber, polyisoprene rubber, or natural rubber, etc., for example. A particle diameter of the glass material 22 is 250 to 400 μm. The glass material 22 is generally made of the same material described above with respect to the glass material 2 in the first embodiment.

The synthetic resin which forms the lure main body 21 is initially a liquid that is mixed with the glass material 22 and molded in a predetermined mold, whereby the lure is manufactured.

The lure structured as described above realizes a similar effect to that described in relation to the second embodiment. Further, since the caudal fin portion 21a of the lure main body 21 does not contain the glass material 22, the caudal fin portion 21a is relatively flexible as compared to the other portion, and hence, easily vibrates in running water when the lure swims in water and accordingly attracts a fish's interest.

Fourth Embodiment

A fourth embodiment of the present invention will be described below with reference to FIGS. 5 and 6.

Figure 5:
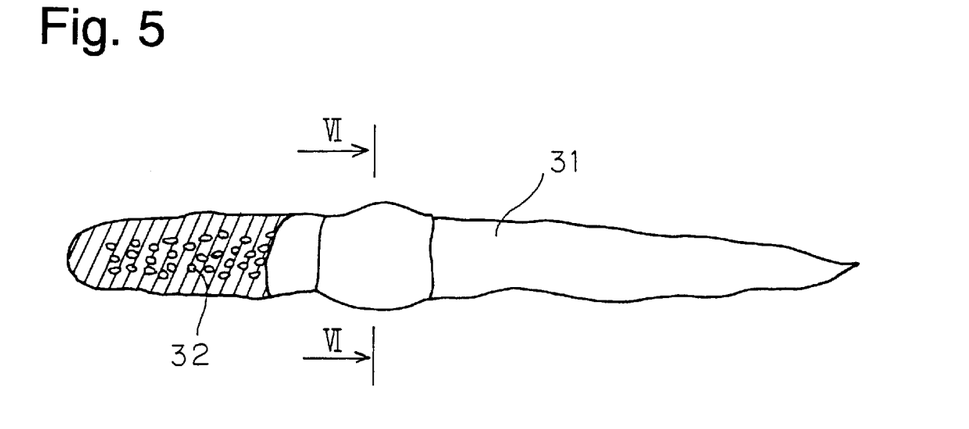
FIG. 5 is a side view of a lure according to a fourth preferred embodiment of the present invention.
Figure 6:
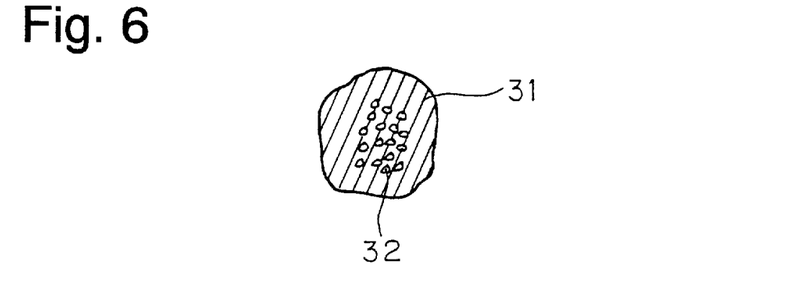
FIG. 6 is a cross sectional view of the lure depicted in FIG. 5 taken along a line IV—IV in FIG. 5.

As shown in FIGS. 5 and 6, a soft bait lure according to the fourth embodiment of the present invention includes a lure main body 31 which is formed by an elastic synthetic resin to have an outer shape resembling a small animal and a glass material 32 which is mixed in the lure main body 31 in the vicinity of the center of cross-section of the lure main body 31 along a longitudinal direction of the lure main body 31.

The lure main body 31, as in the first embodiment, is an elastic member. In order to strongly appeal to a fish in water, a fluorescent color is added to the synthetic resin which forms the lure main body 31 or the lure main body 31 is painted on its surface in a variety of patterns or colors. Further, the glass material 32 is a powder-like material crushed to have a particle diameter of approximately 50 to 150 μm. The material that makes up the glass material 32 is generally the same glass material 2 described above in the first embodiment.

The lure is manufactured as described in the following.

Figure 7A:
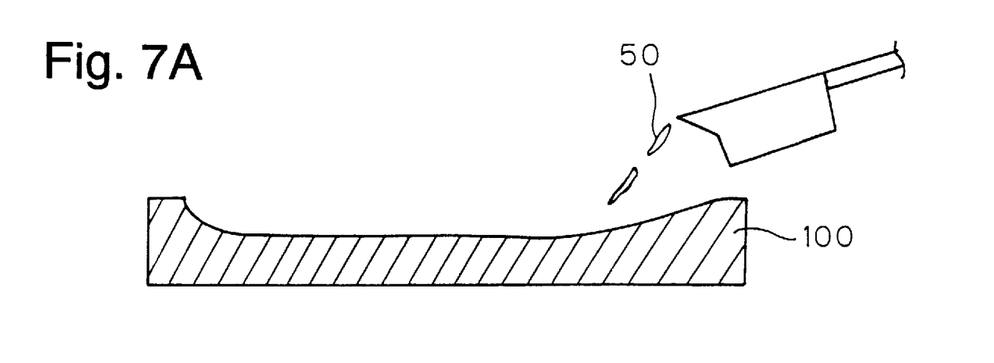
FIGS. 7A and 7B are side views of molds showing steps for manufacturing the lure according to the fourth embodiment of the present invention depicted in FIGS. 5 and 6.
Figure 7B:
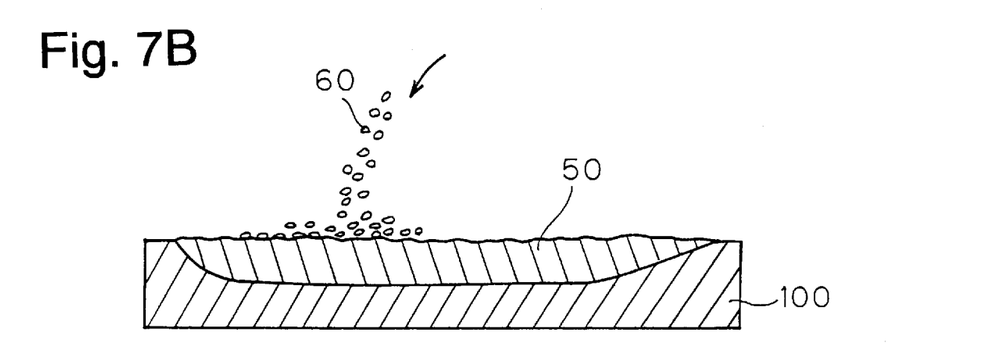

As shown in FIG. 7A, a pair of bisected molds 100 (only one is depicted in FIG. 7A) having patterning in the form of an outer shape of the lure main body 31 is provided. A liquefied synthetic resin 50 (which later forms the lure main body 31) is thereafter poured into each of the bisected molds 100. Following this, as shown in FIG. 7B, a glass material 60 (which corresponds to the glass material 32) is disposed on a surface of the poured synthetic resin 50. Resulting paired bisected members 50 are thereafter combined to each other, whereby the lure is manufactured.

In the lure structured as described above, since the glass material 32 which is mixed in the lure main body 31 increases the specific gravity of the lure as a whole, the lure sinks quickly in water. Further, since even long-time use of the lure does not cause the glass material 32 to dissolve from the lure main body 31, the lure will not crumble nor will the hook 3 inserted in the lure rust away. Moreover, since the glass material 32 is mixed in the lure main body 31 in the vicinity of the center of cross-section of the lure main body 31 along the longitudinal direction of the lure main body 31, the lure keeps a good balance in water and hence swims smoothly.

Fifth Embodiment

A fifth embodiment of the present invention is described below with reference to FIGS. 8, 9 and 10.

Figure 8:
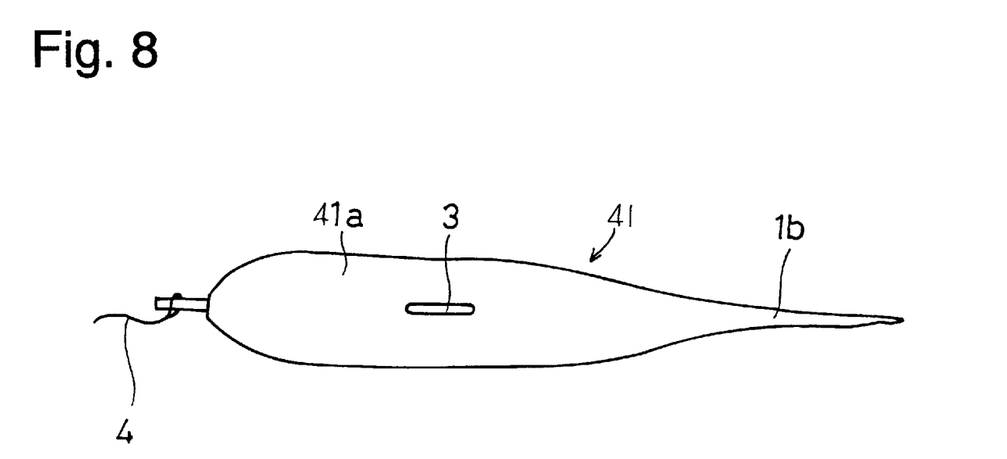
FIG. 8 is a top view of a lure according to a fifth embodiment of the present invention.
Figure 9:
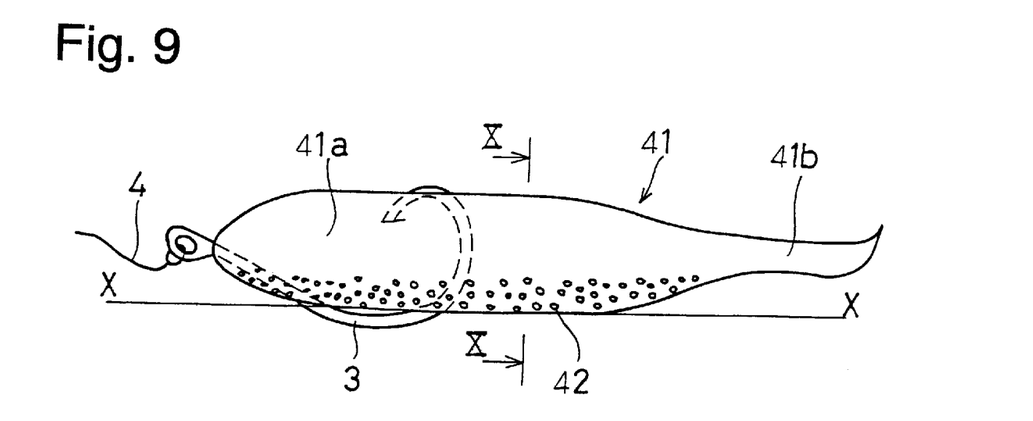
FIG. 9 is a side view of the lure depicted in FIG. 8.
Figure 10:
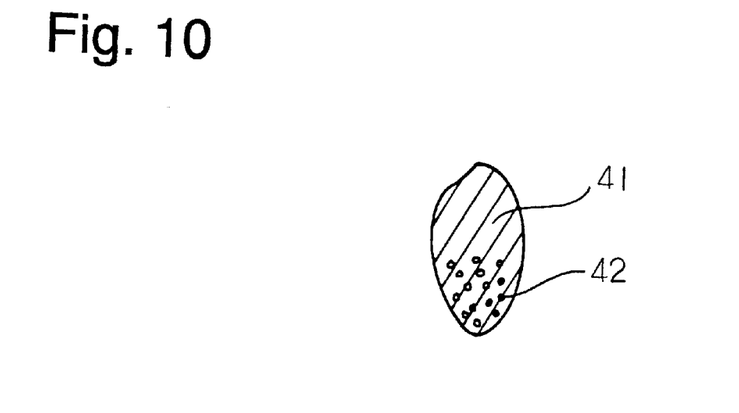
FIG. 10 is a cross sectional view of the lure depicted in FIG. 9, taken along a line X—X in FIG. 9.

As shown in FIGS. 8 to 10, a soft bait lure according to the fifth embodiment of the present invention includes a lure main body 41 which is formed by an elastic synthetic resin to have an outer shape resembling a small fish and a glass material 42 which is mixed in the lure main body 41.

The lure main body 41 includes a torso portion 41a and a caudal fin portion 41b that is integrally formed with the torso portion 41a to a rear portion of the torso portion 41a. The torso portion 41a is shaped approximately as a cylinder. The caudal fin portion 41b is thinner than the torso portion 41a in a width direction of the caudal fin portion 41b (See FIG. 8), and formed approximately in a plate-like shape such that a bottom surface of the caudal fin portion 41b is positioned above a plane X extending along and from a bottom surface of the torso portion 41a (See FIG. 9). Further, the lure main body 41 is an synthetic elastic resin material such as vinyl polychloride, polychloroprene rubber, polyisoprene rubber, or natural rubber, etc. The glass material 42 is the same material 2 described above in the first embodiment.

The glass material 42 is locally disposed in the vicinity of a bottom portion of the torso portion 41a of the lure main body 41. The glass material 42 is a powder-like material crushed to have a particle diameter of approximately 100 to 150 μm. While the glass material 42 may be transparent, a glass material of glass which is colored in various colors may be used instead.

The lure is manufactured as described in the following.

Figure 11A:
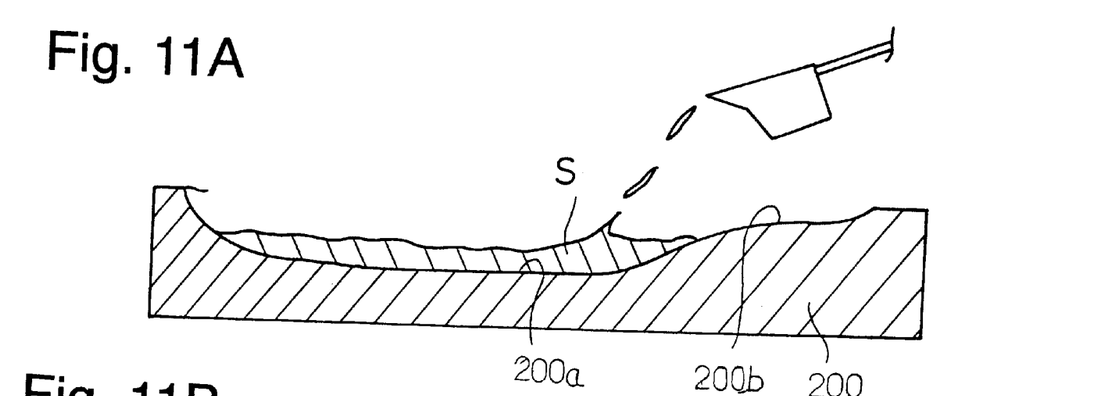
FIGS. 11A and 11B are diagrams showing steps for manufacturing the lure depicted in FIGS. 8, 9 and 10.

As shown in FIG. 11A, a first bisected mold 200 is prepared with patterns for forming the lure main body 41 with an outer shape of a bottom surface side portion of the torso portion 41a and an outer shape of a bottom surface side portion of the caudal fin portion 41b. A bottom surface 200b of the first bisected mold 200 which corresponds to the caudal fin portion 41b is positioned above a line extending from a bottom surface 200a which corresponds to the bottom surface of the torso portion 41a. In addition, a second bisected mold (not shown) is prepared which corresponds to the bisected mold 200 and patterns outer shapes of top surface side portions of the torso portion 41a and the caudal fin portion 41b. A liquefied synthetic resin S is poured in the first bisected mold 200 and the second bisected mold (not shown).

Figure 11B:
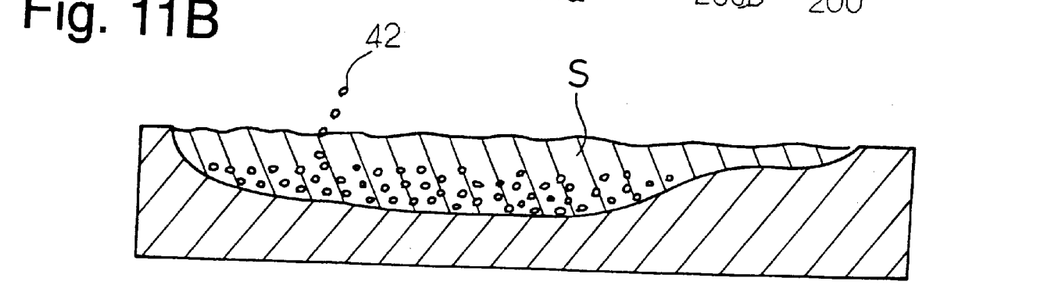

Following this, as shown in FIG. 11B, the glass material 42 is mixed in with the synthetic resin S that was poured in the first bisected mold 200. At this stage, the glass material 42, due to its own weight, sinks in the vicinity of the bottom surface 100a of the torso portion 41a which is at a deeper position than in the vicinity of the bottom surface 200b of the caudal fin portion 41b. The first bisected mold 200 and the second bisected mold are then joined and the synthetic resins within the bisected molds are integrated with each other, whereby the lure is manufactured.

The lure described above, as shown in FIG. 8, is used with a hook 3 attached to one end of a line 4 and is inserted from the hook end side into the lure main body at the lure head side and is held in place by contact with the inside of the lure main body. When the lure is cast into water, since the glass material 42 mixed in the lure main body 41 increases the specific gravity of the lure as a whole, the lure sinks quickly. Further, since the glass material 42 does not dissolve from the lure main body 41 even if the lure is used over a long period of time, the lure will not crumble nor will the hook 3 inserted in the lure rust away.

In addition, the glass material 42 is mixed only in the vicinity of the bottom surface of the torso portion 41a of the lure main body 41. Hence, the caudal fin portion 41b which does not contain the glass material 42 reacts sensitively to running water, and therefore, the lure makes sharp swimming-like movement. Moreover, the center of gravity of the lure located in the vicinity of the bottom surface of the torso portion 41a stabilizes a swimming posture of the lure, so that the lure moves smoothly. Further, when receiving light in water, the beads-like glass material 2 contained in the lure main body 1 reflects light diffusely and attracts a fish's interest.

Sixth Embodiment

Figure 12:
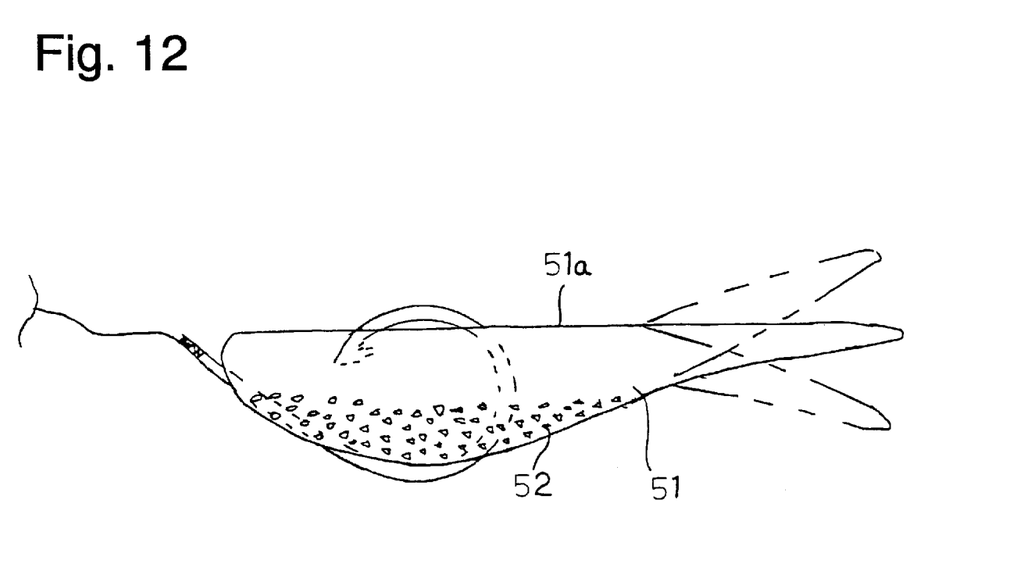
FIG. 12 is a side view of a lure according to a sixth embodiment of the present invention.

As shown in FIG. 12, a lure may be manufactured using only one mold. That is, a lure main body 51 is formed in one mold so that the lure main body 51 has a flat surface 51a. A glass material 52 is locally disposed on the side opposite the flat surface 51a. The lure swims in a stable condition, with its side which seats the glass material 52 and hence has a larger specific gravity directed toward the bottom of water.

Modifications (a) The shape of a lure main body is not limited to those described in relation to the embodiments above. The lure main body may be formed in other shapes such as those of various types of fishes and small animals including a crayfish, etc.

(b) Instead of a glass material, metallic particles of zinc, tungsten and the like, small metallic balls, metallic powder, etc., may be mixed in a lure main body. In this case as well, an increased specific gravity of the lure as a whole sinks the lure quickly in water.

(c) A glass material or a metallic material may be mixed in a synthetic resin which forms a lure main body in advance, so that the glass material is mixed in the entire lure main body.

ACTUAL EXAMPLES

The present invention is described below with specific examples.

Transparent glass materials (Unipowder, available from Union Co., Ltd.) having different particle diameters (smaller than 50 μm, 50–150 μm, 250–400 μm, 400–600 μm, 600–1500 μm) were mixed in vinyl polychloride which was heated and liquefied. The glass materials were mixed entirely in vinyl polychloride such that lures to be manufactured had specific gravity values of 1.2 g/cm$^3$, 1.4 g/cm$^3$ and 1.6 g/cm$^3$. The specific gravity of the glass materials was 2.5 g/cm$^3$. Vinyl polychloride mixed with the glass materials was poured in molds to make a variety of lures, each set of lures having one of the particle diameter sizes mentioned above.

Restoration of Shape

The manufactured lures were each pressed (deformed) and squashed, and observations were made with respect to whether or not the lures would restore their original molded shapes. The table below shows the results after squashing with a finger, wherein the symbol × denotes the lures which completely failed to restore the original shapes, the symbol Δ denotes those which restored the original shapes yet with poor appearances or took an extremely long time to restore the original shapes, the symbol ○ denotes those which restored the original shapes and maintained good appearances, and the symbol ⊙ denotes those which restored the original shapes quickly and showed no change to appearances.

| Specific Gravity (g/cm$^3$) | 50 μm | 50–150 μm | 250–400 μm | 400–600 μm | 600–1500 μm |
|---|---|---|---|---|---|
| 1.2 | X | @ | ○ | Δ | X |
| 1.4 | X | @ | ○ | Δ | X |
| 1.6 | X | @ | ○ | Δ | X |

As shown in the table above, when the glass material has a particle diameter of approximately 50–600 μm, it is possible to manufacture lures having various specific gravity values while maintaining excellent restoration of shape.

Easiness of Molding

At a step of introducing liquefied vinyl polychloride into molds, observations were made with respect to whether or not vinyl polychloride easily hardened and vinyl polychloride was easily molded. The table below shows the results, wherein the symbol × denotes vinyl polychloride whose hardening was difficult and hence molding was extremely difficult, the symbol Δ denotes vinyl polychloride which took a long time to harden and the resultant molded shapes were easily destroyed, and the symbol ○ denotes vinyl polychloride which exhibited easily molded.

| Specific Gravity (g/cm$^3$) | 50 μm | 50–150 μm | 250–400 μm | 400–600 μm | 600–1500 μm |
|---|---|---|---|---|---|
| 1.2 | X | ○ | ○ | ○ | ○ |
| 1.4 | X | ○ | ○ | ○ | ○ |
| 1.6 | X | Δ | ○ | ○ | ○ |

As shown in the table above, when the glass material had a particle diameter smaller than 50 μm, molding of vinyl polychloride was difficult. In the case of the lures which contained increased quantities of the glass materials and hence had a specific gravity of 1.6 (g/cm$^3$), even when the particle diameters of the glass materials exceeded 50–150 μm, manufacturing tended to become difficult. It is assumed that molding becomes difficult as the quantity of the glass material to be mixed increases further.

Whitening

With respect to the manufactured lures, the extent of the lure losing its transparency and becoming less transparent or whitened due to the glass materials was visually examined. The table below shows the results, wherein the symbol × denotes the lures which exhibited dramatic whitening, the symbol Δ denotes the lures which exhibited slight whitening, and the symbol ○ denotes the lures which maintained transparency of vinyl polychloride and the glass materials.

| Specific Gravity (g/cm³) | 50 μm | 50–150 μm | 250–400 μm | 400–600 μm | 600–1500 μm |
| --- | --- | --- | --- | --- | --- |
| 1.2 | X | Δ | ○ | ○ | ○ |
| 1.4 | X | Δ | ○ | ○ | ○ |
| 1.6 | X | X | ○ | ○ | ○ |

As shown in the table above, when the glass material had a particle diameter smaller than 50 μm, dramatic whitening occurred. In the case of the lures which contained increased quantities of the glass materials and hence had a specific gravity of 1.6 (g/cm³), even when the particle diameters of the glass materials exceeded 50–150 μm, the lures tended to whiten.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A soft-bait fishing lure for holding a hook inserted therein, the lure comprising:

an elastic synthetic resin body; and glass particles approximately 50–1500 μm in diameter incorporated into said elastic synthetic resin body in a proportion to said elastic synthetic resin body selected such that the fishing lure has a specific gravity of approximately 1.2–1.6 g/cm³.

2. The soft-bait fishing lure as set forth in claim 1, wherein said glass particles are approximately 50 to 400 μm in diameter.

3. The soft-bait fishing lure as set forth in claim 1, wherein said glass particles are incorporated into said elastic synthetic resin body predominantly in a ventral half of said elastic synthetic resin body defined by its conformation.

4. The soft-bait fishing lure as set forth in claim 1, wherein said glass particles are superficially subjected to an amino-silane coupling reaction prior to incorporation into said elastic synthetic resin body.

5. A soft-bait fishing lure for holding a hook inserted therein, the lure comprising:

an elastic synthetic resin torso;

an elastic synthetic resin caudal fin portion formed integrally with and narrower than said torso, therein defining a ventral portion of said torso having no axes of symmetry in common with said caudal fin portion; and glass particles approximately 50–1500 μm in diameter incorporated only into the ventral portion of said torso portion in a proportion to said elastic synthetic resin body selected such that the fishing lure has a specific gravity of approximately 1.2–1.6 g/cm³.

6. The soft-bait fishing lure as set forth in claim 5, wherein said glass particles are superficially subjected to an amino-silane coupling reaction prior to incorporation into said elastic synthetic resin body.

7. A soft-bait fishing lure for holding a hook inserted therein, the lure comprising:

a elastic synthetic resin body; and metallic particles approximately 50–1500 μm in diameter incorporated into said elastic synthetic resin body in a proportion to said elastic synthetic resin body selected such that the fishing lure has a specific gravity of approximately 1.2–1.6 g/cm³.

8. The soft-bait fishing lure as set forth in claim 7, wherein said metallic particles are superficially subjected to an amino-silane coupling reaction prior to incorporation into said elastic synthetic resin body.

* * * * *